US010767353B2

(12) United States Patent
Ientile et al.

(10) Patent No.: US 10,767,353 B2
(45) Date of Patent: Sep. 8, 2020

(54) GEARED MIXING FAUCET (71) Applicant: AS America, Inc., Piscataway, NJ (US)

(72) Inventors: Joseph John Ientile, Port Murray, NJ (US); Xiaojing Ye, Edison, NJ (US)

(73) Assignee: AS America, Inc., Piscataway, NJ (US)

( * ) Notice: Subject to any disclaimer, the term of this patent is extended or adjusted under 35 U.S.C. 154(b) by 297 days.

(21) Appl. No.: 15/865,084

(22) Filed: Jan. 8, 2018

(65) Prior Publication Data
US 2018/0195258 A1 Jul. 12, 2018

Related U.S. Application Data (60) Provisional application No. 62/444,091, filed on Jan. 9, 2017.

(51) Int. Cl.
F16K 11/078 (2006.01)
E03C 1/04 (2006.01)
F16K 31/60 (2006.01)
F16K 31/53 (2006.01)

(52) U.S. Cl.
CPC .......... E03C 1/0412 (2013.01); E03C 1/0404 (2013.01); F16K 11/0782 (2013.01); F16K 31/53 (2013.01); F16K 31/602 (2013.01); F16K 31/605 (2013.01)

(58) Field of Classification Search
CPC .... E03C 1/0412; E03C 1/0404; F16K 31/605; F16K 11/0782; F16K 31/53; F16K 31/602; Y10T 137/7907–7921; Y10T 137/9464
See application file for complete search history.

(56) References Cited

U.S. PATENT DOCUMENTS 2,204,257 A * 6/1940 Powers .................. F16K 11/18
137/636.3
D301,162 S    5/1989 Oberdorfer
(Continued)

FOREIGN PATENT DOCUMENTS

CN    303034528    12/2014
DE    3426740    1/1986
(Continued)

OTHER PUBLICATIONS

Notice of Allowance dated Nov. 16, 2018, directed to MX Application No. MX/f/2017/002011; 5 pages.
(Continued)

Primary Examiner — Marina A Tietjen
(74) Attorney, Agent, or Firm — Morrison & Foerster LLP (57) ABSTRACT A faucet that uses a gearing mechanism to allow the faucet handle to be placed much closer to the mixing valve is disclosed. Various embodiments involve geared mechanical operation of a mixing faucet, where the gears transfer motion of a handle to a faucet valve, which may allow for a lower handle (e.g., a handle placed closer to the faucet body). In some embodiments, an upper gear is provided in a faucet handle, and the upper gear may be held in a carrier. A set screw may lock the handle in place. Finally, a lower gear may be pushed onto the top of a valve stem. When the handle is lifted, the upper gear rotates against the lower gear, causing the valve to open. The carrier may rotate within the valve body, thus allowing for temperature control of the valve.

28 Claims, 9 Drawing Sheets

(56) References Cited

U.S. PATENT DOCUMENTS

| | | | |
|---|---|---|---|
| 7,373,952 B2* | 5/2008 | Gaenzle | E03C 1/0404 137/625.4 |
| D618,765 S | 6/2010 | Wang | |
| D662,181 S | 6/2012 | Thun | |
| D689,987 S | 9/2013 | Kington et al. | |
| 9,151,405 B2* | 10/2015 | Marotz | F16K 31/602 |
| D767,723 S | 9/2016 | Hong | |
| D787,644 S | 5/2017 | Hong | |
| D830,515 S | 10/2018 | L'henaff | |
| 2007/0145319 A1* | 6/2007 | Hoernig | E03C 1/0412 251/248 |
| 2009/0026402 A1* | 1/2009 | Loschelder | F16K 27/045 251/235 |
| 2011/0000564 A1* | 1/2011 | Corbin | F16K 11/0787 137/625.4 |

FOREIGN PATENT DOCUMENTS

| | | | |
|---|---|---|---|
| DM | 084253 | | 8/2014 |
| EP | 1837568 | | 9/2007 |
| FR | 2830601 | | 4/2003 |
| WO | 2013/093522 | | 6/2013 |
| WO | WO2018117708 | * | 3/2017 |

OTHER PUBLICATIONS

Decision to Grant a Design dated Jun. 1, 2018, directed to JP Application No. 2017-014738; 6 pages.

First Office Action dated Oct. 26, 2017, directed to CN Application No. 201730295966.7; 2 pages.

International Search Report and Written Opinion dated Apr. 9, 2018, directed to International Application No. PCT/US2018/012829; 11 pages.

Office Action dated May 22, 2018, directed to BR Application No. BR 30 2017 002778-4; 2 pages.

\* cited by examiner

GEARED MIXING FAUCET

REFERENCE TO RELATED APPLICATIONS

This application claims the benefit of U.S. Provisional Application No. 62/444,091, filed Jan. 9, 2017, the entire contents of which are hereby incorporated by reference herein.

FIELD OF THE INVENTION

The present invention generally relates to faucets, and in particular to a geared mixing faucet.

BACKGROUND OF THE INVENTION

Conventional faucets mix hot water and cold water coming into the faucet from separate source lines. To do this, a mixing valve is provided in the faucet, and generally a handle is used to control the flow of hot and cold water, which mix with one another to form create an output water of a desired temperature. Many conventional faucets are operated by a single lift-handle, which is usually mounted on top of a faucet. A conventional lift-handle is mounted to a faucet at its back end with a handle extending upward and forward from the mounting point. The lift-handle is thus configured such that lifting the handle causes the flow of hot and/or cold water to be opened, and pivoting the handle from left to right about its mounting point controls the temperature of the water dispensed.

The handle of a lift-handle faucet generally is a long arm structure that allows the user to actuate the lift-handle. Due to the conventional structure and operation of such mixing valves, the arm tends to extend upwardly from the rear of the faucet and make a substantial, albeit acute, angle with the faucet outlet.

Furthermore, in conventional lift-handle faucets, the lift-handle sits high above the faucet body itself because a valve stem of the mixing valve extends above the top of the faucet body such that the mixing handle, when rotated upward about its mounting point where it joins the faucet body, rotated about the axis of rotation of the valve stem and causes the mixing valve to open to allow the flow of water. Thus, because the axis of rotation of the valve stem must align with the axis of rotation of the lift-handle, the lift-handle must sit at a predetermined height above the top of the faucet body. Furthermore, because conventional lift-handles are configured to rotate about an axis of rotation of a valve stem, lift handles are substantially linearly displaced with respect to the faucet body when they are lifted, requiring large mounting structures and skirt structures to mask the substantial linear movement and cover the large gaps that are necessitated by said movement.

SUMMARY OF THE INVENTION

As explained above, conventional lift-handle faucets tend to have an arm-like handle that extends upward and away from the faucet body at a substantial angle, and additionally tend to extend from a raised knob or other protrusion that extends from the top of the faucet body in order to house the valve stem and to facilitate the axis of rotation of the valve stem aligning with the axis of rotation of the lift-handle at its mounting point where it joins the faucet body. Thus, it is difficult in conventional lift-handle faucets for the lift handle to have a low profile atop the faucet, such that the handle arm is close to the faucet body and that the handle arm is not required to be mounted to a large knob that protrudes upward above the faucet body. Furthermore, it is difficult in conventional lift-handle faucets for the lift handle to be maneuvered without undergoing substantial linear displacement with respect to the faucet body.

Thus, there is a need for a novel mechanical apparatus for controlling the mixing of hot and cold water in a faucet that allows for placing a handle arm such that it is essentially parallel, or nearly parallel with the faucet body, such that is may be mounted in close proximity to a faucet body, such that a it is not required to be mounted to a large knob that protrudes upward above the faucet body, and such that it does not undergo linear displacement with respect to the faucet body when it is actuated.

A faucet that may address the needs described above operating using gearing is disclosed herein. In some embodiments, gears may be used to transfer motion of a faucet handle to a mixing valve. This arrangement may allow for a handle to be placed lower and closer to a faucet body, thus enabling unique designs. An upper gear may be provided in the handle, the gear held in a carrier. A set screw may be provided that locks the handle in place. A lower gear that can be pushed onto the valve stem located in a valve body may also be provided. When the handle is lifted, the upper gear in the handle may rotate against the lower gear in the valve body, which may causes the valve to open. In this way, a low-profile geared lift-handle faucet may be provided where an axis of rotation for lifting the lift-handle need not align with an axis of rotation of a valve stem; rather, motion may be transferred to the valve stem via a plurality of gears. In some embodiments, the geared mechanism may be disposed partially inside a carrier that may rotate within the valve body to allow temperature control of the valve.

In some embodiments, a faucet is provided, the faucet comprising a faucet body; a mixing cartridge, disposed inside the faucet body, comprising a valve stem, wherein the mixing cartridge is configured to receive hot water and cold water and to dispense mixed water to be dispensed by the faucet; a handle, disposed on the faucet body; and a plurality of gears, disposed inside the faucet body, configured to transfer motion from the handle to the valve stem in order to actuate the valve stem and adjust flow through the mixing cartridge.

In some embodiments of the faucet, the plurality of gears comprise: a first gear coupled to the handle; and a second gear coupled to the valve stem.

In some embodiments of the faucet, the first gear and second gear are configured to engage one another such that the first gear drives rotation of the second gear.

In some embodiments of the faucet, the first gear is coupled to an underside of the handle by one or more screws.

In some embodiments of the faucet, the second gear is coupled to the valve stem by a press-on connection.

In some embodiments of the faucet, the first gear and second gear are forced toward one another by one or more springs.

In some embodiments of the faucet: rotating the handle about a first axis of rotation causes the first gear to rotate about the first axis of rotation; and rotating the second gear about a second axis of rotation causes the valve stem to rotate about the second axis of rotation distinct from the first axis of rotation.

In some embodiments of the faucet, causing the valve stem to rotate about the second axis of rotation adjusts a flow rate of the mixed water dispensed by the faucet.

In some embodiments of the faucet, the first axis of rotation and the second axis of rotation are parallel to one another.

In some embodiments of the faucet, the faucet further comprises a carrier disposed inside the faucet body, wherein the carrier is configured to rotate about a third axis of rotation perpendicular to the second axis of rotation.

In some embodiments of the faucet, the third axis of rotation intersects one or both of the first axis rotation and the second axis of rotation.

In some embodiments of the faucet, the carrier comprises a cylindrical body portion configured to fit in rotating facing relation with an interior surface of the faucet body.

In some embodiments of the faucet: the carrier comprises a protruding portion extending from an upper surface of the carrier; and the first gear is mounted on the protruding portion of the carrier.

In some embodiments of the faucet, the first gear is mounted on the protruding portion of the carrier by one or more pins defining the first axis of rotation.

In some embodiments of the faucet, the carrier comprises an opening in an upper surface of the carrier, the opening configured to allow the first gear and the second gear to engage one another through the opening.

In some embodiments of the faucet, the carrier is configured to be disposed inside the faucet body above the mixing cartridge.

In some embodiments of the faucet, the handle is configured to be rotatable about the third axis of rotation to cause the carrier to rotate about the third axis of rotation.

In some embodiments of the faucet, the handle is configured to be rotatable about the third axis of rotation to cause the valve stem to rotate about the third axis of rotation.

In some embodiments of the faucet, causing the valve stem to rotate about the third axis of rotation adjusts a temperature of water dispensed by the faucet.

In some embodiments of the faucet, rotating the handle about a third axis of rotation causes the first gear to rotate about the third axis of rotation.

In some embodiments of the faucet, the first axis of rotation intersects a plane defined by an upper surface of the faucet body.

In some embodiments of the faucet, the handle is mounted to the faucet body at a proximal end of the handle, the proximal end of the handle comprising a rounded portion protruding downward toward and into the faucet body.

In some embodiments, a faucet gear assembly is provided, the faucet gear assembly comprising: a first gear configured to be disposed inside a faucet body; and a second gear configured to be disposed inside the faucet body; wherein the first gear and the second gear are configured to engage with one another to transfer motion from a faucet handle to a valve stem in order to actuate the valve stem.

In some embodiments of the faucet gear assembly, the first gear and second gear are configured to engage one another such that the first gear drives rotation of the second gear.

In some embodiments of the faucet gear assembly: the first gear is configured to be coupled the faucet handle; and the second gear is configured to be coupled to the valve stem.

In some embodiments of the faucet gear assembly: the first gear is configured such that, when the first gear is coupled to the faucet handle, rotating the handle about a first axis of rotation causes the first gear to rotate about the first axis of rotation; and the second gear is configured such that, when the second gear is coupled to the valve stem, rotating the second gear about a second axis of rotation causes the valve stem to rotate about the second axis of rotation.

In some embodiments, any of the limitations discussed above may apply alone and/or in combination with any one or more of the other limitations discussed above, with respect to the faucet and/or the faucet gear assembly discussed above, as would be appreciated in light of the present disclosure.

BRIEF DESCRIPTION OF THE DRAWINGS

The present disclosure is discussed in greater detail below with reference to exemplary embodiments illustrated in the accompanying drawings, in which.

DETAILED DESCRIPTION OF THE INVENTION

As described above, there is a need for faucet assemblies in which a lift-handle of the faucet assembly is mounted on the faucet body in a low-profile manner, such that an arm of the lift handle is disposed close to the faucet body and at an essentially perpendicular angle to the faucet body. Furthermore, there is a need for lift-handle faucet assemblies that do not have large protrusions atop the faucet body and/or the lift-handle at the point at which the lift-handle joins the faucet body. Additionally, there is a need for lift-handle faucet assemblies that, when lifted, rotate in a compact manner, such that the lift-handle does not pivot about an axis of rotation that is located at or near an end of the handle and/or substantially below a top surface of the lift handle, causing the entire lift-handle to life up and away from the faucet body.

Disclosed herein are geared mixing faucets that may address one or more of the needs discussed above. As described in further detail below, with reference to the figured herein, a geared mixing faucet may use two or more gears to transfer motion of an actuated lift handle to a valve stem, such that the lift handle need not directly mate with the valve stem. Because the handle need not mate with the valve stem, the handle need not have a raised knob or other receiving portion configured to receive the valve stem, and the handle may therefore have a smaller be placed closer to a faucet body and may have a smaller size and a lower profile atop the faucet body.

Furthermore, a geared mixing faucet using a geared mechanism to transfer force to a valve stem may be configured such that it is lifted by rotating about an axis of rotation that is central to semi-spherical or ball-shaped base portion of the lifting handle, such that the lift handle may rotate about semi-sphere shaped base portion that may itself remain at an immutable height and lateral position with regard to the faucet body. Thus, lifting (and/or rotating) the handle about the ball-shaped base portion may not cause the entirety of the lift-handle to move upward and/or away from the faucet body, thereby providing a lower profile lift handle.

Below, embodiments of geared mixing faucets are discussed with respect to the figures of this application.

Figure 1A:
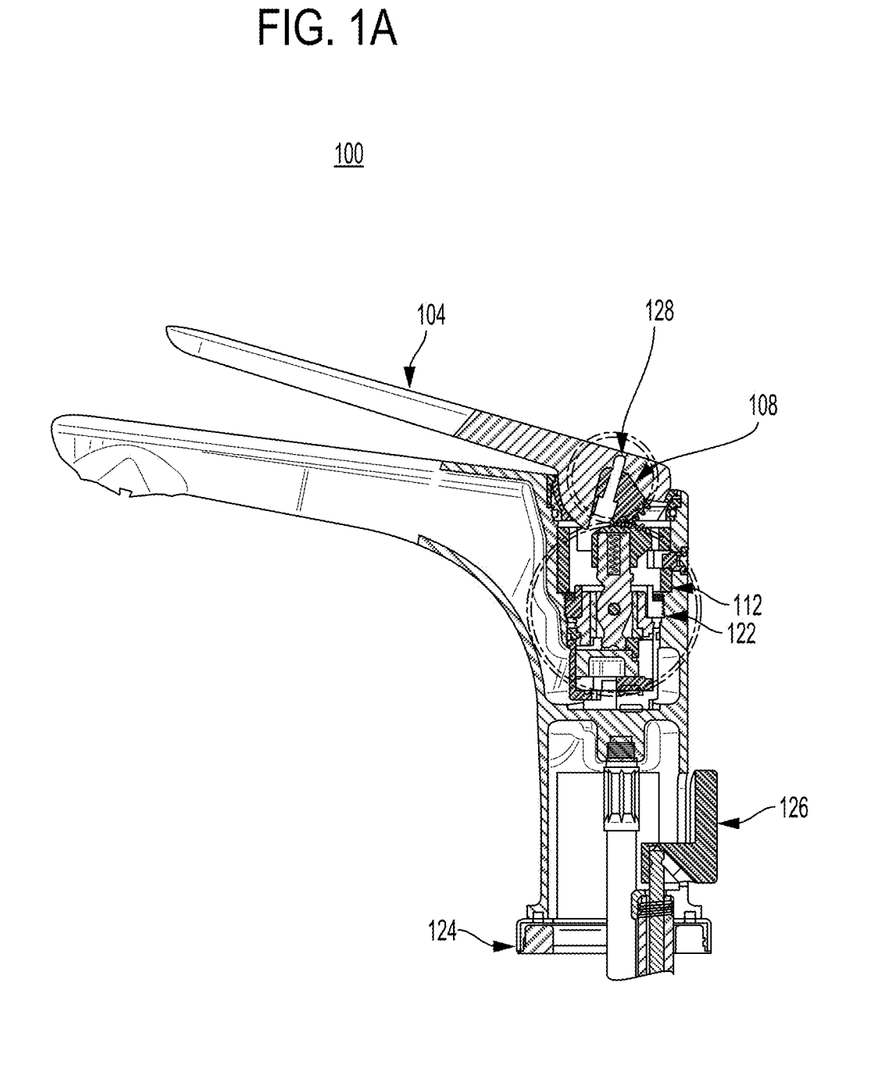
FIG. 1A depicts a cross-sectional side view of a geared faucet assembly, in accordance with some embodiments.
Figure 1B:
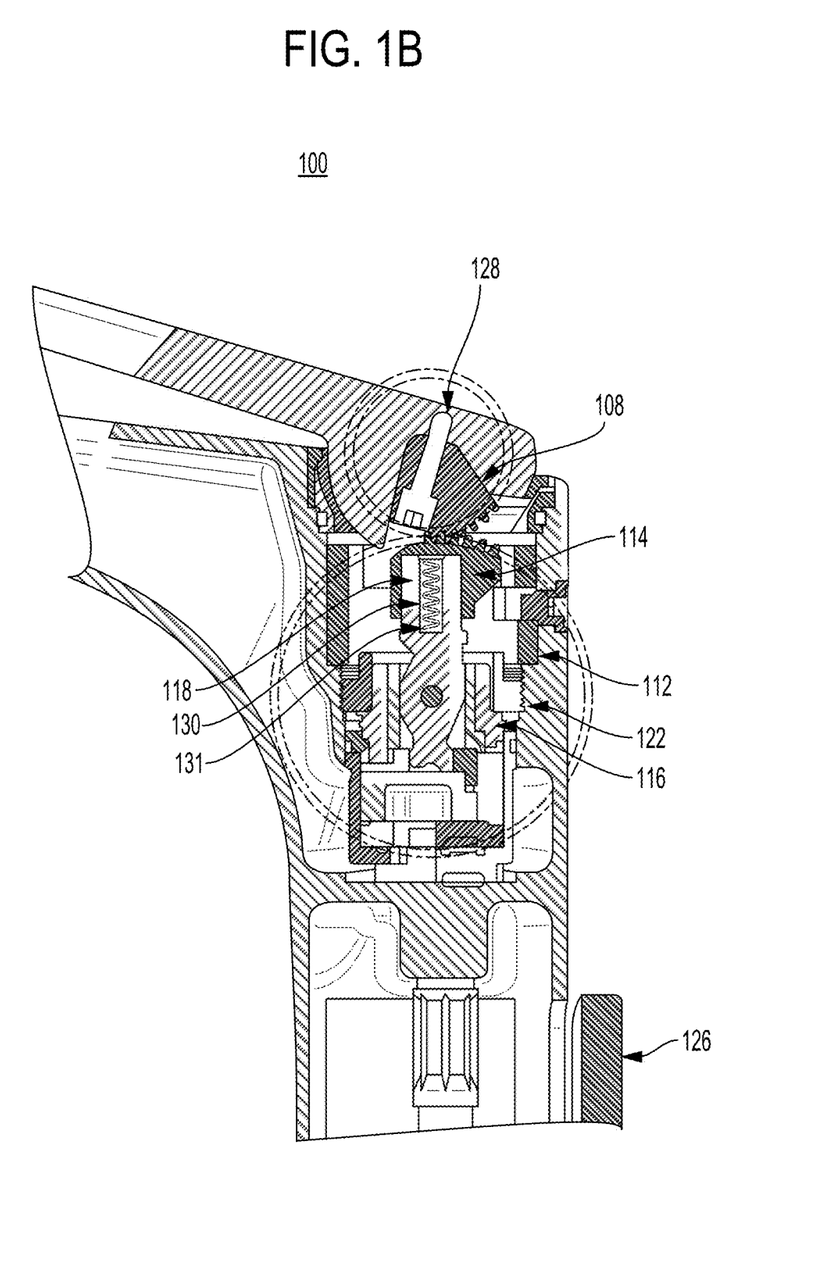
FIG. 1B depicts a zoomed cross-sectional side view of a geared faucet assembly, in accordance with some embodiments.

FIG. 1A shows a cross-sectional side view of an upper portion of faucet assembly 100 that may sit above a sink or other surface on which the faucet of assembly 100 is mounted, in accordance with some embodiments. FIG. 1B shows a magnified cross-sectional side view of a rear portion of faucet assembly 100, in accordance with some embodiments. The view of FIG. 1B is a zoomed-in view of the view in FIG. 1A.

Faucet assembly 100 may be any faucet assembly including a faucet configured to receive hot water and cold water from a water supply line and to dispense hot, cold, or mixed water. In some embodiments, faucet assembly 100 may comprise a hot water supply line and a cold water supply line, the lines configured to supply hot and cold water, respectively, to a mixing cartridge included in assembly 100. In some embodiments, the mixing cartridge of valve 100 may be configured to receive hot and cold water from separate supply lines and to allow the flow of one or both of hot and cold water through the mixing cartridge, such that hot, cold, or mixed water may be dispensed by the faucet of faucet 100. In the example of FIGS. 1A and 1B, faucet assembly 100 comprises mixing cartridge 116, which may be configured to receive hot water from a hot water supply line (not shown) and to receive cold water from a cold water supply line (not shown) and to dispense hot, cold, and/or mixed water through a neck and out an outlet of the faucet of faucet assembly 100. As discussed below, the flow of hot and/or cold water through mixing cartridge 116 and thereby through faucet assembly 100 may be controlled by a lift-handle, such as lift-handle 104, configured to operate a geared assembly.

As shown in FIG. 1A, faucet assembly 100 may include a faucet having a faucet body, wherein the faucet body has lift-handle 104 mounted on it. In the example shown, handle 104 is mounted on top of the faucet body of faucet assembly 100. The components illustrated in cross-sectional view in both FIG. 1A and FIG. 1B demonstrate how a geared handle and valve assembly may be used to actuate a valve of faucet assembly 100 using a lift-handle.

As shown in FIGS. 1A and 1B, the mixing faucet of assembly 100 may include upper gear 108 and lower gear 114, which may be configured to engage with one another such that movement of handle 104 may transfer force and motion through upper gear 108 to lower gear 114, thereby causing rotation of lower gear 108 and actuation of valve stem 118. Actuation of valve stem 118 may cause one or more valves in mixing cartridge 116. This functionality is explained in greater detail below.

As shown, handle 104 may be a lift-handle configured to control flow and temperature of the faucet, and may be mounted atop the faucet body. As shown, upper gear 108 may be a gear that is joined to or fixed to the underside of handle 104, proximate to the portion of handle 104 that mounts to the faucet body. In the example show, upper gear 108 is fixed to handle 104 using screw 128. In some embodiments, rather than using screw 128, other attachment mechanisms or techniques may be used to fix or otherwise couple handle 104 to upper gear 108, such as one or more clamps, springs, latches, press-fit or press-on mechanisms, quarter-turn mechanisms, magnetic connectors, adhesive connections, welded connections, or the like. In some embodiments, handle 104 may be permanently attached to upper gear 108, while in some embodiments the attachment may be removable, such as being removable by a user by hand and/or using tools. In some embodiments, handle 104 and upper gear 108 may have one or more springs interposed in a connection between the components, such that the one or more springs may force the components away from one another; in some embodiments, the components may be forced into contact with one or more other elements of assembly 100 (e.g., upper gear 108 may be forced downward by a spring toward and into contact with another gear) and thereby held in place.

In some embodiments, upper gear 108 may be circular, semi-circular, or pie-piece-shaped, having a circular (or ovular) outer circumference on which a plurality of teeth is disposed. In the example shown, the outer circumference of gear 108 faces away from handle 104 (in this example, downward facing) such that the teeth on the outer circumference may engage the teeth of one or more other gears. Thus, as handle 104 is lifted, handle 104 and gear 108 rotate together about the axis of rotation shown in the center of the smaller dotted circle in FIGS. 1A and 1B. As shown, gear 108 may be fixed to handle 104 in such a way that the center-point of a circular outer edge of gear 108 aligns with an axis of rotation of handle 104, such that the outer edge of gear 108 sweeps through a circular motion (without substantial lateral displacement, e.g., upward, downward, leftward, or rightward displacement in FIG. 1A) as handle 104 is lifted.

As shown in FIGS. 1A and 1B, upper gear 108 may be held in faucet handle 104, which may be held in a carrier 112. Carrier 112 may be cylindrical or partially cylindrical in shape, and may be configured to house one or more components of assembly 100, such as upper gear 108, such that the components held inside carrier 112 may be permitted to rotate inside the faucet body of assembly 100. In some embodiments, carrier 112 may be configured to sit inside the faucet body, with the outer surface of carrier 112 in facing relationship with the inner surface of the faucet body, as show for example in FIGS. 1A and 1B. As shown clearly in FIG. 1B, carrier 112 may sit on top of a lip inside the faucet body, such that carrier 112 may sit above a mixer cartridge that may contain the one or more valves to be actuated and from which the valve stem may extend upward. In the example of FIGS. 1A and 1B, carrier 112 sits above cartridge nut 122, which may be screwed into place using a threaded connection with a portion of the interior surface of the faucet body in order to hold the mixing cartridge in place. When handle 104 is rotated from side to side (e.g., rather than up and down), it may cause upper gear 108 and carrier 112 to rotate along with it, and the rotation of upper gear 108 and/or carrier 112 may force rotation of one or more valves (e.g., by rotating valve stem 118 from side to side) that cause hot and/or cold water to be selectively allowed to flow through the mixing cartridge, thereby controlling the temperature of the water dispensed by the faucet of assembly 100.

As shown in FIGS. 1A and 1B, socket head cap screw 128 may lock handle 104 in place. Lower gear 114, which may be mounted below upper gear 108 and configured to mate with upper gear 108, may communicate with valve stem 118 of a mixing cartridge.

Lower gear 114 may be configured to be mounted on the end of valve stem 118, such as by being pressed down onto valve stem 118, and may in some embodiments be locked into place on the valve stem by any suitable attachment mechanism, such as one or more clamps, springs, latches, press-fit or press-on mechanisms, quarter-turn mechanisms, magnetic connectors, adhesive connections, welded connections, or the like. In some embodiments, valve stem 118 may be permanently attached to lower gear 114, while in some embodiments the attachment may be removable, such as being removable by a user by hand and/or using tools. In some embodiments, valve stem 118 and lower gear 114 may have one or more springs interposed in a connection between the components, such that the one or more springs may force the components away from one another; in some embodiments, the components may be forced into contact with one or more other elements of assembly 100 (e.g., lower gear 114 may be forced upward by a spring toward and into contact with another gear) and thereby held in place. In some embodiments, one or more springs (e.g., spring 131) may be disposed in channel 130 inside valve stem 118, such that the spring, when compressed, exerts force downward on valve stem 118 and upward on lower gear 114.

In some embodiments, lower gear 114 may be circular, semi-circular, or pie-piece-shaped, having a circular (or ovular) outer circumference on which a plurality of teeth is disposed. In the example shown, the outer circumference of lower gear 114 faces away from valve stem 118 (in this example, upward) such that the teeth on the outer circumference may engage the teeth of one or more other gears. Thus, as handle 104 is lifted and upper gear 108 drives lower gear 114, lower gear 114 and valve stem 118 may rotate together about the axis of rotation shown in the center of the larger dotted circle in FIGS. 1A and 1B. As shown, lower gear 114 may be fixed to valve stem 114 in such a way that the center-point of a circular outer edge of lower gear 114 aligns with an axis of rotation of valve stem 118, such that the outer edge of lower gear 114 sweeps through a circular motion (without substantial lateral displacement, e.g., upward, downward, leftward, or rightward displacement in FIG. 1A) as handle 104 is lifted.

Thus, when faucet handle 104 is lifted, upper gear 108 may rotate clockwise against lower gear 114, which may therefore be caused to rotate counterclockwise. Rotation of lower gear 114 may in turn cause actuation of valve stem 118, which may cause the valve controlled by valve stem 118 to be opened and may allow flow of water from the faucet. In some embodiments, as shown in the example of FIGS. 1A and 1B, valve stem 118 may be rotatable about an axis of rotation, which is shown at the center of the large dotted circle. Rotating valve stem 118 about that axis of rotation may cause a sliding motion of the valve (leftward and rightward in FIGS. 1A and 1B) that may cause one or more openings of the valve to slide to and from an open position and thereby cause the valve to open and close.

As shown in FIGS. 1A and 1B by the dotted circles, upper gear 108 and lower gear 114 may each define a respective circular rotational path through which the outer toothed edges of each gear respectively rotates. As shown, gears 108 and 114 may be positioned such that they interlock with one another, and so that the circular rotational paths are tangent to one another; in this way, rotating upper gear 108 may cause upper gear 108 to drive lower gear 114. As shown, a radius of upper gear 108 may in some embodiments be smaller than a radius of lower gear 114 (e.g., the upper dotted circle is smaller than the lower dotted circle). In some other embodiments, the radius upper gear 108 may be larger than the radius of lower gear 114. In some other embodiments, gears 114 and 108 may have an equal radius. In some embodiments, the relative radii of gears may be selected in consideration of space constraints inside one or more portions of the faucet body, the relative angle through which a handle and/or valve stem should rotate, and/or the force which is desired to be applied to a handle in order to be sufficient to actuate a valve stem.

As shown in FIG. 1A, the faucet of faucet-assembly 100 may be mounted on a sink, counter-top, or other deck or mounting surface by deck and putty plate 124. Furthermore, assembly 100 may include lift knob 126, which may be used to close a sink drain associated with assembly 100.

Figure 2:
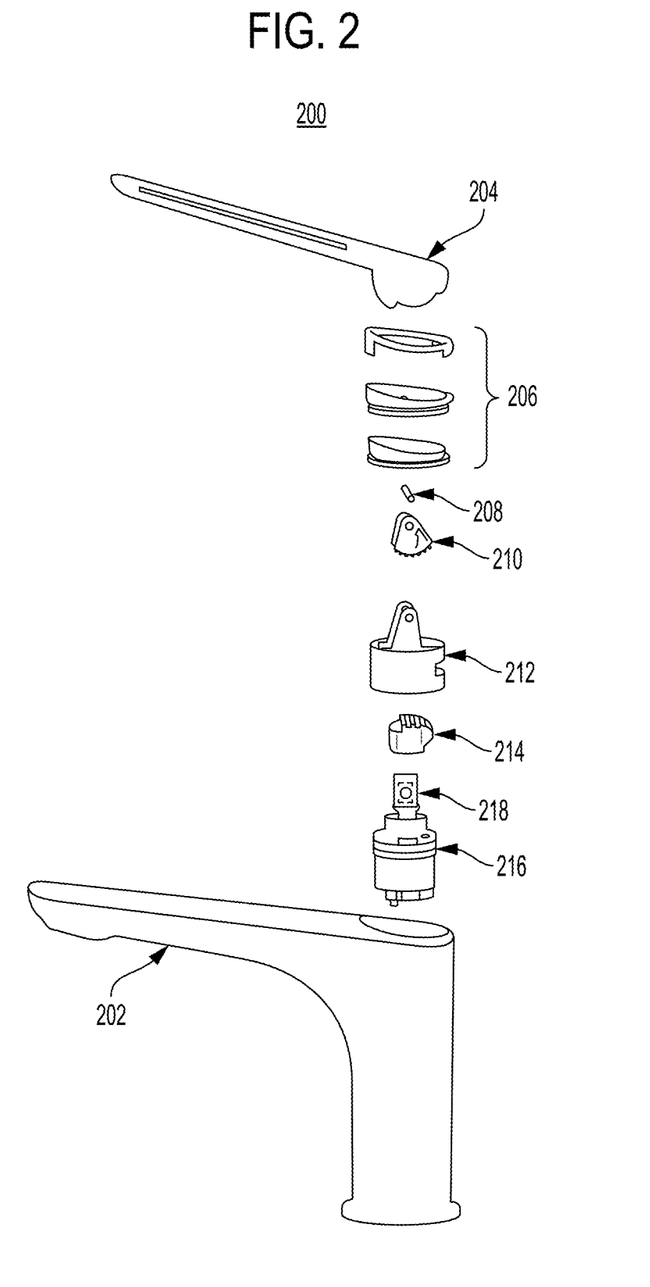
FIG. 2 depicts an exploded view of a geared faucet, in accordance with some embodiments.

FIG. 2 depicts an exploded side view of faucet 200, in accordance with some embodiments. In some embodiments, faucet 200 may share some or all characteristics in common with the faucet of assembly 100 as discussed above with reference to FIGS. 1A and 1B. In some embodiments, faucet 200 may comprise body 202; handle 204; handle fitting assembly 206; upper gear 210; pin 208; carrier 212; upper gear 214; mixing cartridge 216; and valve stem 218. The various components are described in further detail herein, and may be configured to be assembled in the arrangement shown by explosion in FIG. 2, such that internal components 208-218 may be inserted into and fit inside of body 202, beneath handle 204 and handle fitting assembly 206. As described herein, and/or in a same or similar manner as described above with respect to faucet assembly 100, faucet 200 may be configured to transfer force and motion from handle 204 to valve stem 218 by a gear assembly comprising gears 210 and 214.

Faucet body 202 may, in some embodiments, be any housing or body of a faucet, comprising, for example, a base portion to be mounted on a sink, countertop, or other deck; an outlet portion configured to dispense hot, cold, or mixed water; and an intermediary portion comprising, for example, a neck. Body 202 may define a fully or partially enclosed interior space through which hot, cold, and/or mixed water may flow toward one or more outlets. Body 202 may be configured such that one or more internal faucet components may be positioned in the interior space of body 202, including a mixing cartridge such as mixing cartridge 216 as shown in the example of FIG. 2, and such as any one or more of the other components 208-218 as shown in the example of FIG. 2.

Handle 204 may, in some embodiments, be any handle configured to be movable by a user (e.g., movable by hand) to control flow of hot, cold, and/or mixed water through faucet 200. In some embodiments, handle 204 may share any one or more characteristics in common with handle 104 of assembly 100, as discussed above with respect to FIGS. 1A and 1B.

As shown, handle 204 may be a lift-handle configured to be rotated about a first axis of rotation (e.g., lifted upward) in order to control flow of water and to be rotated about a second axis of rotation (e.g., rotated left to right) in order to control the temperature of the water dispensed. In some embodiments, the first axis of rotation may be perpendicular to the second axis of rotation. In some embodiments, the first and second axis of rotation may intersect. In the example shown in FIG. 2, the first axis of rotation extends from left to right with respect to a user standing in front of the dispensing end of faucet 200, such that lifting handle 204 up and down may turn the flow of water on and off; in the example shown, the second axis of rotation is vertical with respect to a user standing in front of the dispensing end of faucet 200, such that turning handle 204 side to side may control water temperature. In some embodiments, some or all of the components of faucet 200 may be oriented in any suitable orientation with respect a deck, a user, and/or other faucet components; in some embodiments, one or both of the axes of rotation may be rotated from their orientation shown in FIG. 2. For example, lift-handle 204 may in some embodiments be horizontally mounted on a side of a faucet body, rather than mounted on top as in the example shown.

Handle 204 may, in some embodiments, be mounted to body 202 using handle fitting assembly 204, which may comprise one or more components (e.g., bearings, fittings, sealing components, etc.) configured to attach handle 204 to body 202 in a movable manner. For example, handle fitting assembly 204 may be configured to attach handle 204 to body 202 in such a manner than handle 204 may rotate about both axes of rotation as discussed above.

In some embodiments, handle 204 may comprise a round or semi-spherical portion near its mounting end, which may be configured to be seated inside a round or semi-spherical receiving portion formed by handle fitting assembly 206, such that the round portion of handle 204 may rotate inside the round receiving portion of handle fitting assembly 206. In some embodiments, fitting assembly 206 may be integrally formed as part of body 202, while in some embodiments it may be formed as one or more separate components configured to be assembled to body 202 (as shown in the example of FIG. 2).

Upper gear 210 may, in some embodiments, be any gear configured to be driven by movement of handle 204. In some embodiments, upper gear 210 may share any one or more characteristics in common with upper gear 108 of assembly 100, as discussed above with respect to FIGS. 1A and 1B. In some embodiments, upper gear 210 may be configured to be fixed to handle 204 in any suitable manner, such as any of the attachment means for upper gear 108 discussed above (e.g., attaching by a screw). As shown, upper gear 210 may have a lateral through-hole configured to receive pin 208, which may be used to join upper gear 210 (and attached handle 204) to carrier 212 (discussed further below).

In some embodiments, pin 208 may be any suitable pin (e.g., a metal or plastic pin or rod) configured to join gear 210 to carrier 212 and to allow gear 210 to rotate about pin 208 with respect to carrier 212. Thus, in some embodiments, the center-line of pin 210 may define the first axis of rotation discussed above, such that gear 210 and handle 204 may rotate about pin 208 when handle 204 is lifted by a user. In some embodiments, more than one pin may be used (e.g., one pin on each side of gear 210) or other bearings or other rotational attachment mechanisms may be used additionally or in place of pin 210.

As shown in FIG. 2 (and similar to as shown in FIGS. 1A and 1B), the axis of rotation for lifting handle 204 may in some embodiments be configured to intersect the semi-spherical base portion of handle 204, such that the axis of rotation may be located beneath a top surface of handle 204, in front of a back end of handle 204, approximately central to a round or semi-spherical portion of handle 204. Thus, when rotating about the axis of rotation defined by pin 208, handle 204 may be configured to rotate about its round or semi-spherical portion, with the round or semi-spherical portion staying in place without substantial (or any) linear displacement. In some embodiments, the axis of rotation defined by pin 208 may be configured to intersect a plane defined by a top surface of body 202 (or to come within 0.5 inches, 0.25 inches, 0.1 inches, 0.05 inches, 0.01 inches, or 0.005 inches of directly intersecting the plane). In this way, when handle 204 is lifted and rotates about the axis of rotation defined by its semi-spherical portion and pin 208, handle 204 may appear to rotate in place inside (or very near to) the body 202, without substantial vertical or horizontal displacement of the spherical portion of handle 204 from body 202. That is, as handle 204 rotates, a user may visually and manually perceive that the base portion (e.g., semi-spherical portion) of handle 204 may stay in place, without lifting up and without moving backward as the handle is lifted. This may provide a different user experience as compared to conventional lift-handle faucets, where a lift handle may undergo substantial vertical and/or horizontal displacement as it is lifted e.g., if an axis of rotation of the handle is located substantially beneath an upper surface of the conventional lift-handle faucet assembly).

Carrier 212, in some embodiments, may be any suitable carrier configured to enable rotation of one or more components of faucet 200. In some embodiments, carrier 212 may share any one or more characteristics in common with carrier 112 of assembly 100, as discussed above with respect to FIGS. 1A and 1B.

In some embodiments, carrier 212 may have a cylindrical body configured to be rotatable inside body 202. In a similar manner as discussed above with respect to carrier 112 of assembly 100, carrier 212 may be configured to sit above a mixing cartridge (e.g., mixing cartridge 216) inside a faucet body, such as by sitting on a circular lip inside body 202 such that carrier 212 may rotate left to right inside body 202.

In some embodiments, carrier 212 may have one or more protrusions configured to mate with and support a gear, such as gear 210. In the example of FIG. 2, carrier 212 has two triangular protrusions extending from the top surface of the main body of carrier 212, wherein each of the triangular protrusions has a through-hole configured to receive pin 208 and to thereby rotatably mount gear 210 to carrier 212. Thus, gear 210 may be configured to rotate forward and back in the space between the two triangular protrusions of carrier 212, while the entire body of carrier 212 may be configure to rotate (along with gear 210 and handle 204) from side to side. In some embodiments, carrier 212 may be rotatably fixed with respect to side-to-side rotation (e.g., rotation about the second axis of rotation discussed above) to handle 204, such that the side-to-side rotation of handle 204 (e.g., the rotation of handle 212 about the second axis of rotation discussed above) may be enabled by rotation of carrier 212.

In some embodiments, the body of carrier 212 (e.g., the main cylindrical body of carrier 212) may define an open interior space into which one or more components, such as lower gear 214 and/or valve stem 218, may fit. Thus, carrier 212 may be assembled to fit over top of gear 214 and valve stem 218 when faucet 200 is fully assembled.

Lower gear 214 may, in some embodiments, be any gear configured to be mounted to a valve stem (e.g., valve stem 218) or other flow-controlling component of a valve, and to be driven by movement of upper gear 210. In some embodiments, lower gear 214 may share any one or more characteristics in common with lower gear 114 of assembly 100, as discussed above with respect to FIGS. 1A and 1B. In some embodiments, lower gear 214 may be configured to engage with upper gear 210 and to be driven by upper gear 210, such that when a user lifts handle 204 and thereby rotates upper gear 210 about pin 208, upper gear 210 may in turn drive lower gear 214 and cause rotation (and/or other displacement or actuation) of valve stem 218.

In some embodiments, lower gear 214 may be configured to be fixed to valve stem 218 in any suitable manner, such as any of the attachment means for lower gear 114 discussed above (e.g., attaching by a screw, attachment by pressing on top, etc.). As shown, lower gear 214 may, unlike upper gear 210, not have a lateral through-hole for receiving a pin. Rather, lower gear 214 may be configured to fit atop a rotatable valve stem such as stem 218 and to rotate about the axis of rotation of the valve stem. In some embodiments, lower gear 214 may be configured to have a circular outer edge that is positioned about an axis of rotation of valve stem 218 when lower gear 214 is mounted to valve stem 218, such that the axis of rotation is at the center point defined by the circular (or semi-circular) outer edge of lower gear 214.

Mixing cartridge 212 may, in some embodiments, be any mixing cartridge configured to receive hot and cold water (e.g., from separate supply lines) and to allow the flow of one or both of hot and cold water through mixing cartridge 212, such that hot, cold, or mixed water may be dispensed by faucet 200. In some embodiments, mixing cartridge 212 may share any one or more characteristics in common with cartridge 116 of assembly 100, as discussed above with respect to FIGS. 1A and 1B. In some embodiments, mixing cartridge 212 may comprise one or more valve control mechanisms, such as valve stem 218, which may be actuated in order to open and/or close one or more valves of mixing cartridge 212 and to control the flow or hot and/or cold water through mixing cartridge 212.

As shown, mixing cartridge 212 may, in some embodiments, comprise valve stem 214, which may be a protruding stem configured to be actuated in order to open and/or close one or more valves of mixing cartridge 212 and to control the flow or hot and/or cold water through mixing cartridge 212. In some embodiments, rotation of valve stem 212 about a first valve-stem axis of rotation may cause the overall flow of hot and/or cold water to be controlled, while rotation of valve stem 212 about a second valve-stem axis of rotation may cause relative flow or hot versus cold water to be controlled in order to adjust the temperature of the water dispensed by faucet 200.

In some embodiments, the first valve-stem axis of rotation may extend from left to right with respect to a user standing in front of the dispensing end of faucet 200, such that the first valve-stem axis of rotation may be substantially parallel to the first axis of rotation of handle 204. In this way, the geared mechanism comprising gears 210 and 214 may transfer rotational motion of handle 204 about its first axis of rotation to valve stem 214, causing rotation of valve stem 214 about its substantially parallel first axis of rotation.

In some embodiments, the second valve-stem axis of rotation may be vertical with respect to a user standing in front of the dispensing end of faucet 200, such that the second valve-step axis of rotation may be substantially the same as the second axis of rotation of handle 204. In this way, rotational motion of handle 204 about its second axis of rotation may be transferred to valve stem 214, causing rotation of valve stem 214 about its second axis of rotation, which may be substantially the same as the second axis of rotation of handle 204.

As discussed above, some or all of the components of faucet 200 may be oriented in any suitable orientation with respect a deck, a user, and/or other faucet components; in some embodiments, one or both of the axes of rotation of valve stem 218 may be rotated from their orientation shown in FIG. 2. For example, mixing cartridge 216 and valve stem 218 may in some embodiments be horizontally mounted in or near a faucet body, rather than vertically mounted in the faucet body as in the example shown.

When the components (shown exploded in FIG. 2) of faucet 200 are fully assembled, they may fit together in an arrangement sharing some or all of the characteristics of the arrangement of components in assembly 100, as shown in FIGS. 1A and 1B. When assembled, valve stem 218 may be disposed entirely within the interior space defined by body 52, such that stem 218 does not protrude from body 202. Thus, in contrast to conventional lift-handle faucets where a valve stem extends out of the body of the faucet and requires a large knob or other protrusion in the lift-handle to conceal it, lift handle 204 of faucet 200 may have a flat, low-profile upper surface, as valve stem 214 may not extend into handle 204 itself. Rather, handle 204 and valve stem 218 may be located remotely from one another, and motion may be transferred between them via the geared assembly comprising gears 210 and 214. In this way, a flat and low-profile lift-handle that sits low and close to the faucet body may be provided, because the handle need not accommodate a valve stem inside it nor be configured to rotate about an axis of rotation of a valve stem.

Figure 3A:
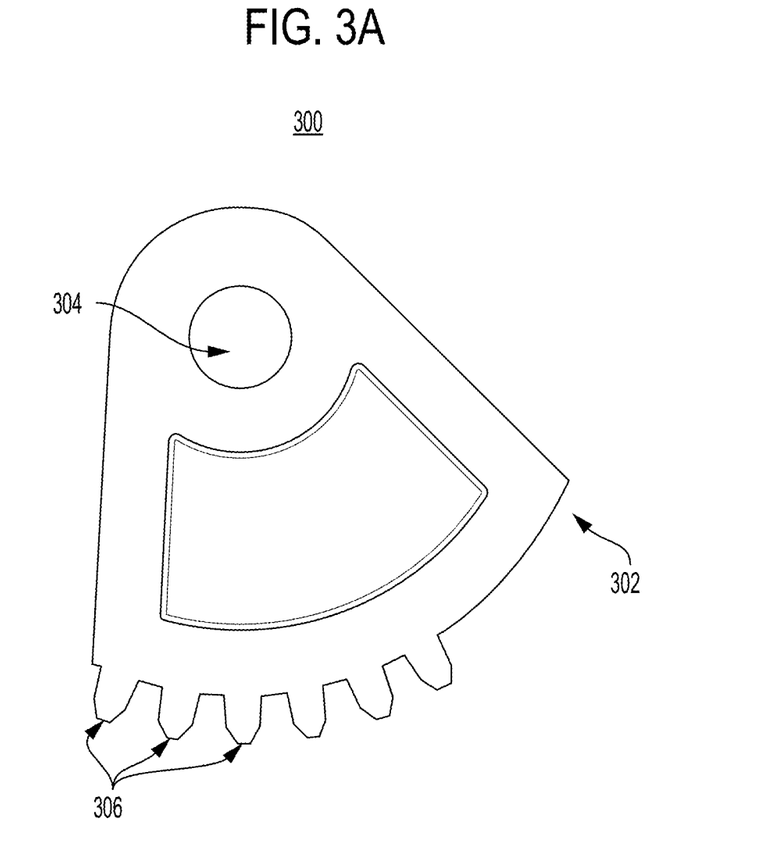
FIG. 3A depicts a side view of a gear, in accordance with some embodiments.
Figure 3B:
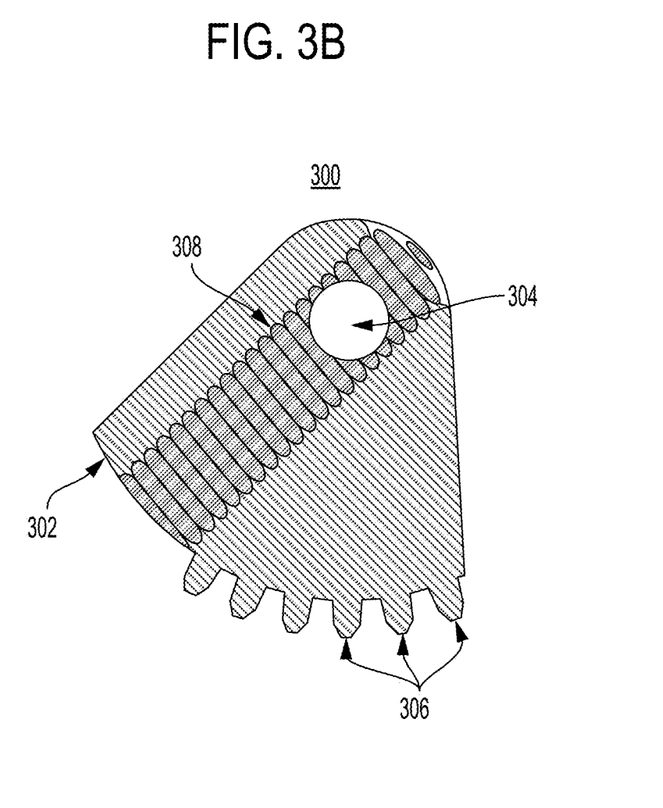
FIG. 3B depicts a cross-sectional side view of a gear, in accordance with some embodiments.

FIGS. 3A and 3B depict a gear 300, in accordance with some embodiments. Gear 300 may, in some embodiments, be an upper gear configured to be attached to and driven by a faucet handle, and to in turn drive a lower gear attached to a valve stem. In some embodiments, gear 300 may share any one or more characteristics in common with upper gear 108 of assembly 100 as discussed above with respect to FIGS. 1A and 1B, and/or with upper gear 210 of faucet 200 as discussed above with respect to FIG. 5A. FIG. 3A depicts a side view of gear 300 in accordance with some embodiments, while FIG. 3B depicts a cross-sectional side view of gear 300 in accordance with some embodiments.

As shown in FIGS. 3A and 3B, gear 300 may have a semi-circular (e.g., pie-slice-shaped) shape, including a downward-facing round or circular outer edge 302 configured to rotate about axis of rotation 304. In some embodiments, axis of rotation 304 may be marked by one or more through holes formed in the body of gear 300, such as for receiving a pin. A plurality of gear teeth 306 may be disposed on outer edge 302 and configured to engage with teeth of one or more other gears. Gear 300 may further comprise channel 308, which may be configured to receive a threaded screw to fix gear 300 to one or more other components, such as fixing it to an underside of a lift handle. In some embodiments, channel 308 may be threaded, while in some embodiments it may not be threaded. In some embodiments, channel 308 may have a uniform width along its entire length, while in some embodiments its width may vary along its length, such as by being wider at one end than at the other.

Figure 4A:
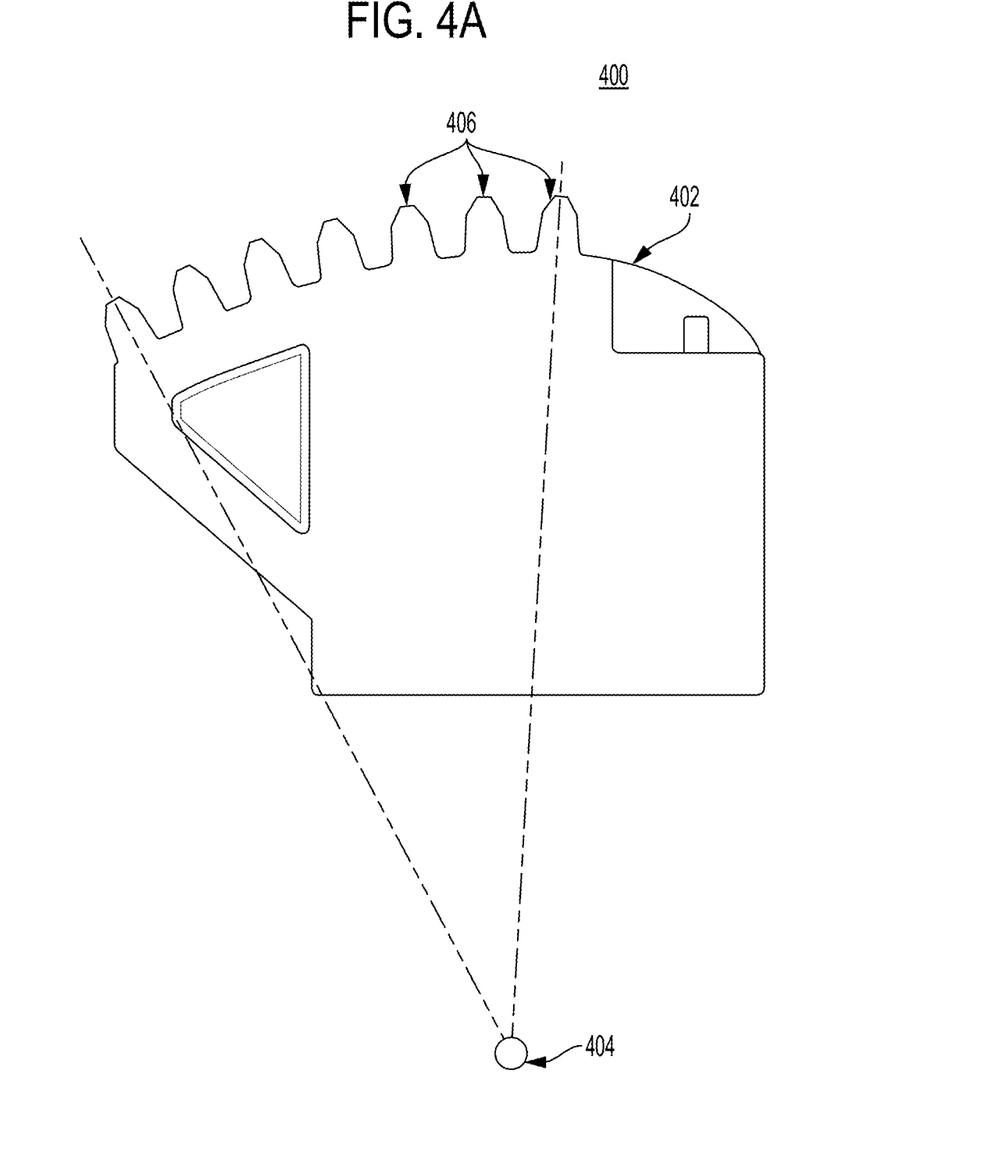
FIG. 4A depicts a side view of a gear, in accordance with some embodiments.
Figure 4B:
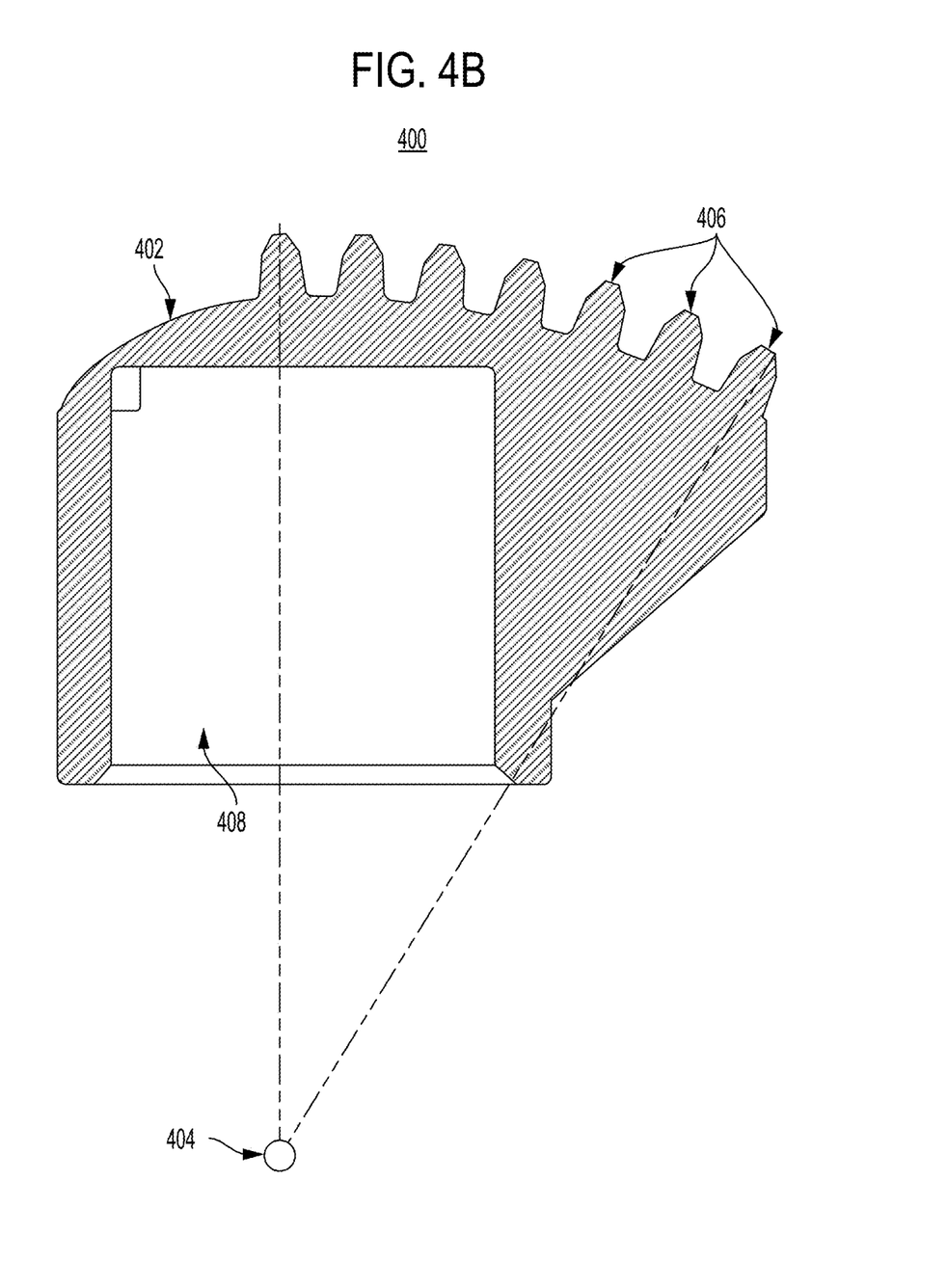
FIG. 4B depicts a cross-sectional side view of a gear, in accordance with some embodiments.

FIGS. 4A and 4B depict a gear 400, in accordance with some embodiments. Gear 400 may, in some embodiments, be a lower gear configured to be driven by an upper gear attached to a faucet handle, and to in turn drive a valve stem to which lower gear 400 is attached. In some embodiments, gear 400 may share any one or more characteristics in common with lower gear 114 of assembly 100 as discussed above with respect to FIGS. 1A and 1B, and/or with lower gear 214 of faucet 200 as discussed above with respect to FIG. 5A. FIG. 4A depicts a side view of gear 400 in accordance with some embodiments, while FIG. 4B depicts a cross-sectional side view of gear 400 in accordance with some embodiments.

As shown in FIGS. 4A and 4B, gear 400 may have a semi-circular (e.g., pie-slice-shaped) shape, including an upward-facing round or circular outer edge 402 configured to rotate about axis of rotation 404. In some embodiments, axis of rotation 404 may be remote from the body of gear 400, such as when gear 400 is configured to rotate about an axis of rotation of a valve stem on which it is disposed. A plurality of gear teeth 406 may be disposed on outer edge 402 and configured to engage with teeth of one or more other gears. Gear 400 may further comprise recess 408, which may be configured to receive a valve stem to couple gear 400 to the valve stem such that gear 400 may drive the valve stem to rotate.

Figure 5A:
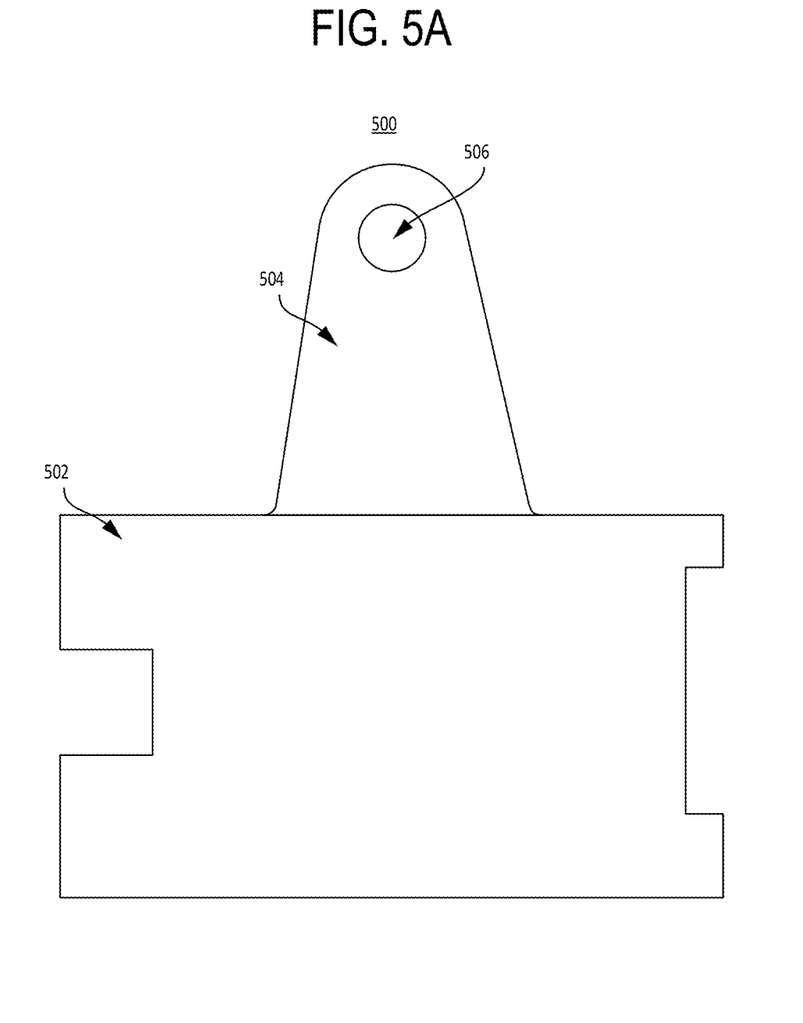
FIG. 5A depicts a side view of a carrier, in accordance with some embodiments.
Figure 5B:
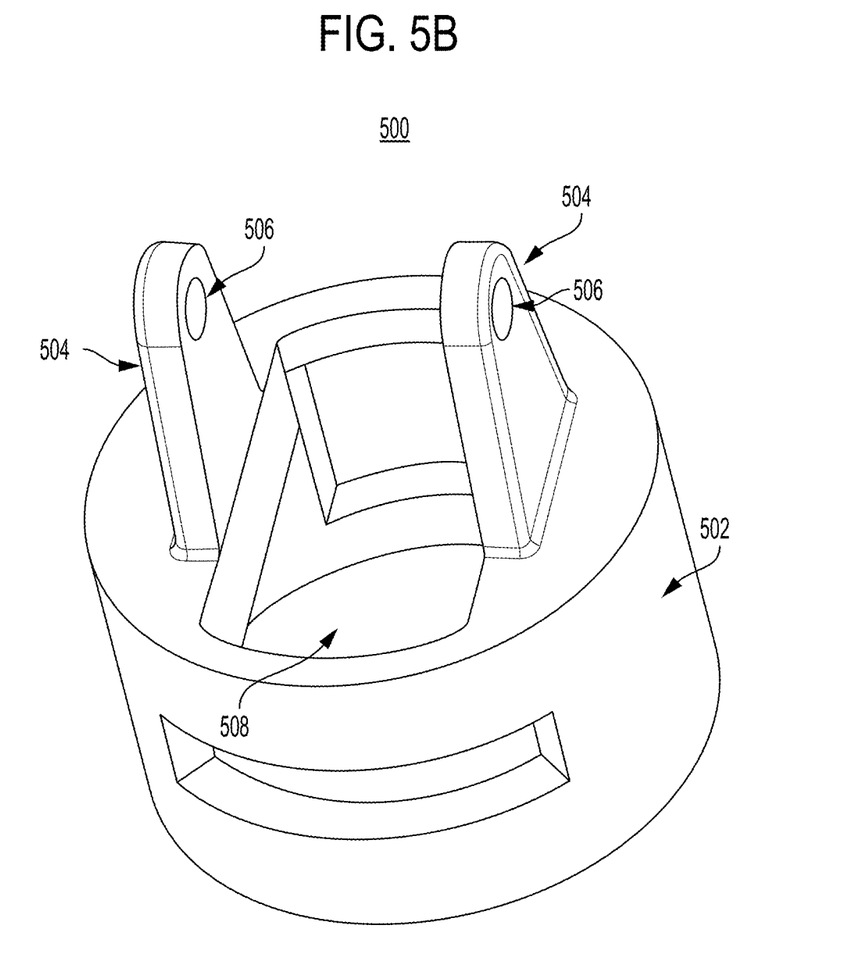
FIG. 5B depicts a perspective view of a carrier, in accordance with some embodiments.

FIGS. 5A and 5B depict carrier 500, in accordance with some embodiments. Carrier 500 may, in some embodiments, be a faucet component configured to rotate inside a faucet body and to rotatable couple to one or more gears of a geared faucet assembly. In some embodiments, carrier 500 may share any one or more characteristics in common with carrier 112 of assembly 100 as discussed above with respect to FIGS. 1A and 1B, and/or with carrier 212 of faucet 200 as discussed above with respect to FIG. 2. FIG. 5A depicts a side view of carrier 500 in accordance with some embodiments, while FIG. 5B depicts a perspective view of carrier 500 in accordance with some embodiments.

As shown in FIGS. 5A and 5B, carrier 500 may comprise main body 502, which may be cylindrical or substantially cylindrical in shape. Carrier 500 may be configured to rotate about an axis of rotation extending vertically through its center, such that the entire cylindrical body 502 may rotate side to side (in some embodiments, along with any components to which carrier 500 is attached). Carrier 500 may further comprise protrusions 504, which may extent upward from an upper surface of body 502. Protrusions 504 may comprise through-holes 506 at their distal ends. Through-holes 506 may be configured to receive a pin or rod to rotatably mount a gear, such as upper gear 300, to carrier 500 for forward and backward rotation about the axis of rotation passing through both through-holes 506. Carrier 500 may further comprise opening 508, which may be an opening formed in an upper surface of body 502 and configured to open the space inside body 502 to the space above body 502 (e.g., to the space between protrusions 504). In some embodiments, opening 508 may permit an upper gear mounted to carrier 500 by through-holes 506 (e.g., gear 300) to engage with a lower gear located inside the interior space of body 502 (e.g., gear 400).

By the interoperation of gear 300, lower gear 400, and carrier 500 as shown in FIGS. 3A, 3B, 4A, 4B, 5A, and 5B, a faucet may be provided having a geared actuating mechanism as discussed herein.

It will thus be seen that the aspects, features and advantages made apparent from the foregoing are efficiently attained and, since certain changes may be made without departing from the spirit and scope of the disclosure, it is intended that all matter contained herein shall be interpreted as illustrative and not in a limiting sense.

The invention claimed is:

1. A faucet comprising:
a faucet body;
a mixing cartridge, disposed inside the faucet body, comprising a valve stem, wherein the mixing cartridge is configured to receive hot water and cold water and to dispense mixed water to be dispensed by the faucet;
a handle, disposed on the faucet body; and
a plurality of gears, disposed inside the faucet body, configured to transfer motion from the handle to the valve stem in order to actuate the valve stem and adjust flow through the mixing cartridge, wherein the plurality of gears comprises a first gear coupled to the handle and a second gear coupled to the valve stem, and wherein the first gear and the second gear are forced toward one another by one or more springs.

2. The faucet of claim 1, wherein the first gear and second gear are configured to engage one another such that the first gear drives rotation of the second gear.

3. The faucet of claim 1, wherein the first gear is coupled to an underside of the handle by one or more screws.

4. The faucet of claim 1, wherein the second gear is coupled to the valve stem by a press-on connection.

5. The faucet of claim 1, wherein:
rotating the handle about an axis of rotation of the first gear causes the first gear to rotate about the axis of rotation of the first gear; and
rotating the second gear about an axis of rotation of the second gear causes the valve stem to rotate about the axis of rotation of the second gear.

6. The faucet of claim 5, wherein causing the valve stem to rotate about the axis of rotation of the second gear adjusts a flow rate of the mixed water dispensed by the faucet.

7. The faucet of claim 5, wherein the axis of rotation of the first gear and the axis of rotation of the second gear are parallel to one another.

8. The faucet of claim 5, further comprising a carrier disposed inside the faucet body, wherein the carrier is configured to rotate about an axis of rotation of the carrier perpendicular to the axis of rotation of the second gear.

9. The faucet of claim 8, wherein the axis of rotation of the carrier intersects one or both of the axis rotation of the first gear and the axis of rotation of the second gear.

10. The faucet of claim 8, wherein the carrier comprises a cylindrical body portion configured to fit in rotating facing relation with an interior surface of the faucet body.

11. The faucet of claim 8, wherein:
the carrier comprises a protruding portion extending from an upward-facing surface of the carrier; and
the first gear is mounted on the protruding portion of the carrier.

12. The faucet of claim 11, wherein the first gear is mounted on the protruding portion of the carrier by one or more pins defining the axis of rotation of the first gear.

13. The faucet of claim 8, wherein the carrier comprises an opening in an upward-facing surface of the carrier, the opening configured to allow the first gear and the second gear to engage one another through the opening.

14. The faucet of claim 8, wherein the carrier is configured to be disposed inside the faucet body above the mixing cartridge.

15. The faucet of claim 8, wherein the handle is configured to be rotatable about the axis of rotation of the carrier to cause the carrier to rotate about the axis of rotation of the carrier.

16. The faucet of claim 8, wherein the handle is configured to be rotatable about the axis of rotation of the carrier to cause the valve stem to rotate about the axis of rotation of the carrier.

17. The faucet of claim 16, wherein causing the valve stem to rotate about the axis of rotation of the carrier adjusts a temperature of water dispensed by the faucet.

18. The faucet of claim 8, wherein rotating the handle about the axis of rotation of the carrier causes the first gear to rotate about the axis of rotation of the carrier.

19. The faucet of claim 5, wherein the first axis of rotation of the first gear lies within a plane defined by an upward-facing surface of the faucet body.

20. The faucet of claim 1, wherein the handle is mounted to the faucet body at a proximal end of the handle, the proximal end of the handle comprising a rounded portion protruding downward toward and into the faucet body.

21. The faucet of claim 1, wherein the one or more springs force the valve stem toward a flow plate of the mixing cartridge.

22. The faucet of claim 1, wherein at least one spring of the one or more springs is disposed in a channel of the valve stem.

23. A faucet comprising:
a faucet body;
a handle, disposed on the faucet body;
a first gear configured to be disposed inside a faucet body;
a second gear configured to be disposed inside the faucet body, wherein the first gear and the second gear are configured to engage with one another to transfer motion from a faucet handle to a valve stem in order to actuate the valve stem, and
one or more springs that force the first gear and the second gear toward one another.

24. The faucet of claim 23, wherein the first gear and second gear are configured to engage one another such that the first gear drives rotation of the second gear.

25. The faucet of claim 23, wherein:
the first gear is configured to be coupled the faucet handle; and
the second gear is configured to be coupled to the valve stem.

26. The faucet of claim 25, wherein:
the first gear is configured such that, when the first gear is coupled to the faucet handle, rotating the handle about axis of rotation of the first gear causes the first gear to rotate about the axis of rotation of the first gear; and
the second gear is configured such that, when the second gear is coupled to the valve stem, rotating the second gear about an axis of rotation of the second gear causes the valve stem to rotate about the axis of rotation of the second gear.

27. The faucet of claim 23, wherein the faucet is configured such that, when the first gear is coupled to the faucet handle and the second gear is coupled to the valve stem, the one or more springs force the valve stem toward a flow plate of a mixing cartridge to which the valve stem is coupled.

28. The faucet of claim 23, wherein the faucet is configured such that, when the second gear is coupled to the valve stem, at least one spring of the one or more springs is disposed in a channel of the valve stem.

* * * * *